（12）United States Patent
Rodi

(10) Patent No.: US 6,591,220 B1
(45) Date of Patent: Jul. 8, 2003

(54) METHOD AND APPARATUS FOR MEASURING ANGLES AND/OR DISTANCES

(75) Inventor: Anton Rodi, Leimen (DE)

(73) Assignee: Herra Rotterdam B.V., Rotterdam (NL)

( * ) Notice: Subject to any disclaimer, the term of this patent is extended or adjusted under 35 U.S.C. 154(b) by 37 days.

(21) Appl. No.: 09/716,872

(22) Filed: Nov. 20, 2000

(30) Foreign Application Priority Data

Nov. 18, 1999  (CH) ............................................. 2105/99

(51) Int. Cl.⁷ ............................................... G01B 11/02
(52) U.S. Cl. .................................................... 702/158
(58) Field of Search .............................. 702/158, 138; 250/237, 131; 257/222; 701/70; 356/372

(56) References Cited

U.S. PATENT DOCUMENTS

| | | | | |
|---|---|---|---|---|
| 4,484,816 A | * | 11/1984 | Ohtomo et al. | ......... 250/237 G |
| 5,235,181 A | * | 8/1993 | Durana et al. | ......... 250/231.18 |
| 5,569,938 A | * | 10/1996 | Shoda et al. | ................ 257/222 |

FOREIGN PATENT DOCUMENTS

| | | |
|---|---|---|
| DE | 195 05 176 A1 | 8/1995 |
| EP | 0 575 843 A1 | 12/1993 |

* cited by examiner

Primary Examiner—John Barlow
Assistant Examiner—Tung S Lau
(74) Attorney, Agent, or Firm—Laurence A. Greenberg; Werner H. Stemer; Ralph E. Locher

(57) ABSTRACT

An apparatus for measuring angles and/or distances includes a sensing head with sensors for determining absolute values and incremental values. The incremental values are provided between two successive absolute values. The apparatus further includes a scale embodiment, which is assigned to the sensing head, and a device for forming a total absolute value from an absolute value determined by a sensor and an incremental value determined by a sensor and for providing this total absolute value in binary/digital form over the entire operating range. The entire signal processing is therefore carried out in the sensing head, so that the complicated signal transmission can be simplified significantly, and complicated peripheral electronics can be dispensed with. A method of measuring angles and/or distances is also provided.

27 Claims, 3 Drawing Sheets

METHOD AND APPARATUS FOR MEASURING ANGLES AND/OR DISTANCES

BACKGROUND OF THE INVENTION

Field of the Invention

The invention relates to a method and an apparatus for measuring angles and/or distances.

Conventional angle/distance measuring systems have either been configured to output incremental signals or to output absolute-value signals and are therefore predominantly used, for example, for specific industrial applications.

Inexpensive incremental transmitters have the disadvantage that during very slow movements/revolutions there is no adequate signal resolution, and that during very rapid movements/revolutions and at high resolution the signal transmission is limited by the frequency.

A resolution of, for example, 18 bits, that is to say 256000 pulses/revolution—which means a resolution of about 4 μm for a 1 m circumference in the case of precise machines—results in signal transmission frequencies of approximately 30 MHz at 6000 rev/min. This is much too high for most control systems and causes problems for an interference-free signal transmission over long distances.

The complicated and expensive absolute transmitters are on the other hand restricted in terms of their internal signal processing by complicated electronics for high resolution and rapid measurement sequences, so that the absolute systems are used only for relatively low rotational speeds.

In recent times, combinations of incremental and absolute transmitters have increasingly been used, for example for servodrives which, at a standstill, transmit the absolute value and during movement sequences transmit the incremental information through the use of sine/cosine signals to be evaluated in a peripheral electronic/control system, which then determines the current value by computation on the basis of the absolute value originally measured at a standstill (see, for example, European Patent No. EP 0 575 843). Therefore, during operation, the measured value is only formed by the extensive peripheral electronics, which is equipped with sample-and-hold components and complex A/D converter components and needs computers or processors both in the transmitter (transducer) electronics and in the peripheral electronics. In addition to the loss of the correct absolute position (interference), which is always a problem in this case, the interference-free transmission of the analog signals in accordance with phase and magnitude is also very critical over long cable lengths and comes up against physical limits in the case of highly dynamic drives (although the bandwidth of the transmission has been reduced through the use of SIN/COS voltages). In addition, it is very difficult to transmit analog signals via optical fibers, so that for the required EMC (electromagnetic compatibility), special and enhanced screening measures have to be taken and complicated line drivers have to be used in the case of copper cables.

These above-described solutions are either inadequate or else very complicated, expensive and unreliable at high resolutions and in the case of rapid movements. For example in the case of the above-mentioned combination of the incremental measurement transmitter and the absolute measurement transmitter, it is therefore necessary to bring the drive or machine to a stop if one wants to check the absolute value or if the latter has to be redetermined in the event of a fault being established. This is already a problem in the case of machines and drives under the current safety standard, and is unsatisfactory for many operational procedures. In addition, the divided measured-value processing results in totally unsatisfactory reliability and responsibility in the case of erroneous measured values, and to similarly erroneous signal processing in service and guarantee work at the user's or customer's premises.

SUMMARY OF THE INVENTION

It is accordingly an object of the invention to provide a method and an apparatus for measuring angles and/or distances which overcome the above-mentioned disadvantages of the heretofore-known methods and apparatuses of this general type.

With the foregoing and other objects in view there is provided, in accordance with the invention, an apparatus for measuring angles and/or distances, including:

a sensing head having a first sensor and a second sensor;

the first sensor determining an absolute value of an angle and/or a distance;

the second sensor determining an incremental value of the angle and/or the distance, the incremental value lying between two successive absolute values; and a circuit for forming a total absolute value from the absolute value and the incremental value and for providing the total absolute value as a binary/digital value, the circuit for forming the total absolute value being provided in the sensing head.

In other words, the apparatus according to the invention for measuring angles and/or distances includes a sensing head having at least one sensor for detecting absolute values of angles and/or distances and at least one sensor for determining incremental values of angles and/or distances lying between two successive absolute values. In the sensing head there is a device for forming a total absolute value from an absolute value determined by at least one sensor and an incremental value determined by at least one sensor and for providing this total absolute value in binary/digital form.

With the objects of the invention in view there is also provided, a method for measuring angles and/or distances, the method includes the steps of:

determining an absolute value with a first sensor of a sensing head of a measuring apparatus;

determining an incremental value with a second sensor of the sensing head;

forming a total absolute value from the absolute value and the incremental value; and providing the total absolute value as a binary/digital value.

In other words, in the method according to the invention for measuring angles and/or distances with the above-defined measuring apparatus, a total absolute value is formed from an absolute value determined by at least one sensor and an incremental value determined by at least one sensor. This total absolute value is provided in binary/digital form.

According to the invention, the absolute value, which is determined by the measuring system, and the fine value, which is determined separately between two values of the determined absolute value, are processed directly in the transmitter electronics (transducer electronics). The absolute value and the fine value are combined and are provided as a total absolute value in binary/digital form to the transmitter output (transducer output) over the entire operating range. The entire signal processing is therefore carried out in the sensing head, so that the complicated signal transmission (cable, screening and so on) is significantly simplified and, above all, the complicated peripheral electronics (A/D converter, sample-and-hold components, computer and so on) can be dispensed with.

In addition, the signal processing, which is provided in the transmitter and has the shortest-possible path connections, not only offers the lowest susceptibility to interference and the highest processing speed, but also allows to control signal delays and allows the most precise fine-value interpolation. The signal delays between the true angle/distance position and the signal output are therefore to be attributed only to the configuration of the transmitter and not to additional factors such as different cable lengths and/or a peripheral-signal processing device. It is therefore possible to compensate for the lagging measured value, also referred to as a slip error, simply by including the signal delays in the signal processing and therefore it is possible to always output the true actual angle/distance position.

In accordance with another feature of the invention, a synchronization device is connected to the circuit for forming the total absolute value, the synchronization device controlling a synchronous combining of incremental values determined by the second sensor for forming the total absolute value.

In accordance with yet another feature of the invention, the first sensor, the second sensor and/or the circuit for forming the total absolute value has a signal delay. A device for including the signal delay in a signal processing is provided in order to correctly form the total absolute value. The device for including the signal delay is connected to the circuit for forming the total absolute value.

In addition, the signal processing, which takes place in the smallest possible space, permits the precise synchronization of registered absolute values (referred to as "coarse values" below) and the incremental values (referred to as "fine values" below) interpolated between the registered absolute values (coarse values). The total absolute value is composed of these two values and requires very careful coordination (synchronization) of the two values if measured values are always to be output with the highest resolution and in real time. In particular in the case of highly accurate servodrives with an "electric shaft" (replacement for highly precise gear wheels), a number of drives have to be managed in synchronism, their angular position has to be interrogated by being "triggered" simultaneously within the microsecond range—and therefore in real time—and their angular position has to be provided for evaluation in the megahertz range through the use of serial data transmission.

In accordance with another feature of the invention, a device for deriving, within a given range of resolution, a movement direction from incremental values determined by the second sensor is provided. The device for deriving the movement direction is connected to the circuit for forming the total absolute value.

Even at a standstill or during very slow movements, precise registration of the position or of the state of movement in terms of direction is of great significance in many applications and is advantageously ensured by the configuration of the measuring system according to the invention up to the highest measurement resolution.

The configuration according to the invention benefits from special application-specific integrated circuits (ASICs), which permit both, optoelectronic modules suitable for processing high resolutions and also permit special hardware for signal processing and fine-value interpolation. Reference is made to Published, Non-Prosecuted German Patent Application No. DE 195 05 176.9, which is hereby incorporated by reference is in the present specification.

In accordance with another feature of the invention, at least one threshold value comparator, preferably a clocked comparator, is connected to the second sensor. The at least one threshold value comparator determines the incremental value from an analog signal.

Here, the comparator technologies are advantageous, in particular circuits with clocked comparators, which permit analog/digital conversions at extremely high signal frequencies and provide the signal processing in the sensor electronics in a less complicated manner than previous algorithms through the use of computing modules. It is particularly advantageous to coordinate the "coarse-value formation" and "fine-value formation", so that for the comparator technology, the interpolation does not have to be implemented for more than 6 bits, for example (hardware integration expenditure always increases by the factor 2 for the next higher resolution). In practice, the "coarse value" is defined in an optimum way at 12 bits, so that with the fine-value formation of 5 or 6 bits, an absolute transmitter with 17 or 18 bits with the aforementioned advantages is achieved. With the increasing processing speeds in semiconductor technology, the measurement system permits flexible adaptation to still higher resolutions or measuring speeds.

In accordance with another mode of the invention, in addition to the total absolute value, analog signals of incremental values are provided.

Even for high-resolution absolute transmitters (e.g. with 20 bits and more) with low movement speeds, it can be expedient to also provide the fine values as analog values to the peripheral control system in addition to the total absolute value of, for example, 18 bits implemented in the sensor. In this case it is expedient to perform the analog/digital conversion in the peripheral control system with a higher resolution. The advantageous result is the absolute-value checking, which is always related to real events and is thus immune to interference, as well as the secured measurement processing of the higher measuring speeds with a lower resolution.

Together with the above-described measures, the ASIC solution offers a great advantage for the operator and the manufacturer, since, for the object set, it is possible to dispense with a computer for the signal processing, and therefore the additional software for operating the angle/distance measuring system can be dispensed with.

In accordance with a further feature of the invention, a serial interface for outputting the total absolute value is provided, the serial interface being connected to the circuit for forming the total absolute value; a peripheral control system for presetting levels is provided; and a processing device is provided for processing the levels via the serial interface.

In accordance with yet a further feature of the invention, the serial interface is an SSI interface.

In accordance with a further feature of the invention, the sensing head is associated with at least one of an RS 422 interface and an RS 485 interface for performing programming functions.

In order to keep the expenditure on cables, plugs and electronics as low as possible, it is expedient to transmit the absolute values serially. Here, the known "SSI interface" (synchronous serial transmission) has been particularly tried and tested, and permits the data to be handled very flexibly (triggering, transmission frequency, resolution and so on).

Since the measured-value processing no longer needs any processing of analog signals by external control systems, the SSI serial interface, for example, is completely adequate for the transmission of the measured data. Since the measured data can be retrieved continuously at a high processing speed, the absolute values are available at a high transmission frequency (e.g. several megahertz) and it is not necessary to transmit any other incremental signals to the peripheral control system.

In accordance with another mode of the invention, a clock signal is lengthened, after a negative clock edge, to a time interval longer than a monoflop time of the serial interface.

In accordance with another mode of the invention, a LOW signal is output with the data line in the serial interface, if a fault is detected.

According to the invention, the clock signal input of the SSI interface can be used for programming functions in addition to the data interrogation defined by SSI conventions. The programming functions can be configured, for example, for manufacturer's purposes (transmitter variants etc.), for application-specific purposes or for customer's purposes (identification, storage of data). In this case, a distinguishing feature is needed for the programming functions. A distinguishing feature which can advantageously be used is prolonging the clock signal after the first negative clock edge to a time interval which is longer than the monoflop time. (The monoflop time is typically about 20 $\mu$s; new angle/distance measured data can be requested only after this time has elapsed.) It is expedient, after this longer time interval has expired, to use a time period, for example corresponding to the monoflop time, as a criterion for the start of the programming function, or for its end, as is usual with SSI. Irrespective of the programming functions, the criteria for "real-time changes", for example during 10 ms (corresponds to one revolution at 6000 rev./min) or simultaneous data transmission can be input via the data line (for example, the absolute value referring to the "zero position" just set, and so on).

In accordance with yet another feature of the invention, the total absolute value is to "zero" with a defined clock edge, via the serial interface.

A particular advantage is offered by one embodiment of the apparatus for measuring angles/distances according to the invention, in which the serial SSI interface is used for a "relative zero setting." Using the relative zero setting, the absolute measuring system is set to "zero" at this time or at this angular position, using the defined clock edge, irrespective of the zero signal permanently encoded by the measurement embodiment. It is therefore possible in this embodiment, under all operating conditions, to provide reference systems which can easily be handled by the peripheral control systems and which permit clear information processing. For example, it is simpler for operators to perform adjustment operations if, starting from a numerical value of 0.000 mm, a relative adjustment of +15 $\mu$m is to be made (that is to say to +0.015 mm), instead of having to execute this from the absolute numerical value of 1.127 mm+0.015 mm=1.142 mm, which is time-consuming and possibly subject to error. In the case of multiple drives, for example in printing machines, this facilitates the monitoring and simultaneous data processing if the phase angle of the printing values all have the same reference value in the case of a correct printed image.

According to the invention, the SSI interface can also be used to implement a "monoflop time setting." The monoflop time setting advantageously supports the very rapid data transmission of the measuring system. Instead of the conventional and fixed monoflop times of about 20 to 30 $\mu$s (new angle/distance measured data can only be transmitted after this time has expired), it is made possible for the peripheral control system to set the suitable or desired time. For very fast peripheral electronics, for example highly dynamic servo drives, the result is therefore virtually interruption-free absolute-value transmissions. At clock frequencies of 1.5 MHz, for example, current 16-bit absolute values have to be transmitted serially in about 10 to 12 $\mu$s. This permits, for example, a quite novel and advantageous configuration of machine-tool control systems with respect to the accuracy of rapid machining processes or with respect to their relatively high speed.

Without violating the standard convention of SSI measured data transmission, and without any additional lines, advantageous programming functions are therefore made possible by the invention using simple circuit measures in the transmitter electronics—for example through the use of RS 422 (or RS 485) interfaces. These programming functions do not even need a computer in the measuring system itself. The entire inventive signal processing in the measured-value transmitter permits the monitoring of the transmitter itself and is advantageously indicated to the peripheral control system immediately via the data line set to a "low" signal. Therefore, in accordance with the SSI convention, the indication of the fault is advantageously transmitted to the peripheral control system without additional expenditure on cables and data communication.

The absolute transmitters (transduces) constructed in accordance with the invention can be used universally and are therefore able to replace the previous inexpensive incremental transmitters and expensive absolute transmitters with divided measured-value processing. The user has not only the advantages of signal processing (resolution, speed); instead the peripheral control system merely has to be configured to process digital data, which is of a significant advantage with control systems, which are increasingly implemented on a PC (personal computer) or a WS (work station), since additional hardware and software is not necessary.

In accordance with another feature of the invention, at least one adapter is connected to the circuit for forming the tot al absolute value. A peripheral control system is connected to the at least one adapter; and the at least one adapter provides a signal decoupling between the sensing head and the peripheral control system.

In accordance with yet another feature of the invention, the at least one adapter includes a voltage supply unit for generating a supply voltage.

In accordance with yet another feature of the invention, the at least one adapter includes a DC decoupling device for a signal transmission.

In accordance with yet another feature of the invention, the at least one adapter is configured such that the peripheral control system is not affected.

Also particularly advantageous is a further embodiment of the invention which includes the cables via interfaces in so-called adapters. The adapters on the transmitter side are suited, for example, for accommodating a suitable supply voltage of 5 V, for example, which advantageously permits the angle and distance measurement transmitter to be constructed with the same voltage supply as the sensor electronics, as in the case of short lines, since the voltage drop over long cables (typically about 1–2 V voltage drop) is compensated for by the 5 V control device. In addition, the adapters provide suitable accommodation for the DC isolation through the use of optocouplers, and therefore the use of optical fibers. The adapter on the control side in turn offers the advantage of unchanged electronic signal processing in the 5 V-PC/WS control environment, without any special plug, cable or screening measures.

This adapter concept—whereby the adapters can be accommodated in the sensor, in the plug or in a separate cable interface as an interface—therefore offers the greatest degree of decoupling, both of the measurement transmitters and also of the control system configuration from the cable link and other signal-matching measures and EMC measures. The cables as optical fibers, for example for the SSI interfaces, offer the advantage of high-quality and interference-free transmission and the omission of complicated and expensive line drivers, both on the side of the measurement transmitter and on the side of the control system. In addition, complicated screening measures are dispensed with, which are cumbersome and costly in operational use, particularly in the case of copper cables with a high cable length. In this embodiment, the angle/distance measuring system is functionally independent of the line length selected (e.g. a maximum of 50–70 m in the case of plastic optical fibers) and is of great advantage for practical handling in field use.

As a result of the adapter concept, in particular the advantages of the continuously determined current total absolute values for the signal transmission of the values may be explained with reference to an SSI interface. In the case of short cables (that is to say without an adapter), for example $\leq 1$ m cable length, clock frequencies above 1.5 MHz can be achieved without difficulty and without any additions in the case of the inventive configuration of the measuring system. This high transmission frequency can also be achieved in the case of long lines using optical fiber cables of about 30 m, although in the normal case a total of 60 m is needed for the outgoing line and the return line. In order to cover the distance of s=60 m, the light in an optical fiber with an effective refractive index of N=1.5 needs the time $$t = \frac{s}{\left(\frac{c}{N}\right)} = 300 \text{ ns},$$

where $c=3\cdot 10^8$ m/s, the speed of light in a vacuum. Given a mark-to-space ratio of about 50%, this already corresponds to a clock frequency of $$f = \frac{1}{2t} = 1.7 \text{ MHz}.$$

However, the transmission frequency can also be increased approximately to about twice the value in the case of the inventive processing of the absolute values, since operations are carried out with an asymmetrical mark-to-space ratio (e.g. 1:5 to 1:10) and the critical delay times are correspondingly placed in the half periods. Here, in particular, optical fibers are of great advantage, since it is only necessary to select optical pulse lengths which have to correspond to the signal processing time of the respective electronics (transmitter/peripheral control system).

This data transmission permits, both with and without an adapter, the very efficient use of a rapid computer as well, which, as a result of the rapid signal availability (after clock interrogation) of a few 10 nsec, as a result of multiplex operation can interrogate a number of measured value transmitters (that is to say servodrives) so to speak in parallel at an extremely high clock frequency, both simultaneously and one after another. Through the use of these measures, transmission ratios are therefore achieved which make the measured-value signal transmission virtually independent of the cable length. These are great advantages, since in this way the configuration of control systems can be carried out without taking into account the signal propagation time through cable lengths, for example in the case of highly dynamic servodrives.

This system-compliant concept of measured-value transmitters and adapters with optical fiber cables therefore permits real-time signal processing, without having to include the otherwise disadvantageous cable lengths. In field use, this is a great facilitation which positively prepares the way for servo-drive technology, which is being used to an increased extent, as a result of measuring transmitters configured in this way.

In accordance with yet another mode of the invention, a synchronous combination of the absolute value and the incremental value is controlled in a sensor electronic circuit in order to form the total absolute value by using incremental values determined by the second sensor.

In accordance with yet another mode of the invention, a movement direction is determined within a resolution range of the measuring apparatus by using incremental values determined by the second sensor.

In accordance with yet another mode of the invention, a signal delay of the measuring apparatus is included in a signal processing when forming the total absolute value.

In accordance with yet another mode of the invention, the incremental value is determined from an analog signal by using threshold value comparators.

In accordance with yet another mode of the invention, the incremental value is determined from an analog signal by using clocked threshold value comparators.

In accordance with yet another mode of the invention, processing levels are impressed by a peripheral control system.

In accordance with yet another mode of the invention, information relevant in terms of level and time is transmitted by using a combination of a data line and a clock line of a serial interface, wherein the levels are impressed by the peripheral control system.

It is not particularly necessary to emphasise that the apparatus outlined for measuring angles/distances, in the configuration according to the invention, can be transferred to various operating principles, for example magnetic, electric, electrostatic, optic principles and so on.

Other features which are considered as characteristic for the invention are set forth in the appended claims.

Although the invention is illustrated and described herein as embodied in a method and an apparatus for measuring angles and/or distances, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Referring now to the figures of the drawings in detail there is shown a preferred embodiment of the optical apparatus for measuring angles/distances according to the invention which preferably includes an electromagnetic radiation source (light source), a scale embodiment, an optical imaging system, a photo ASIC, interface electronics, a sensor housing, and adapter interfaces with cables.

These elements and their use in the apparatus according to the invention will be discussed below.

Figure 1:
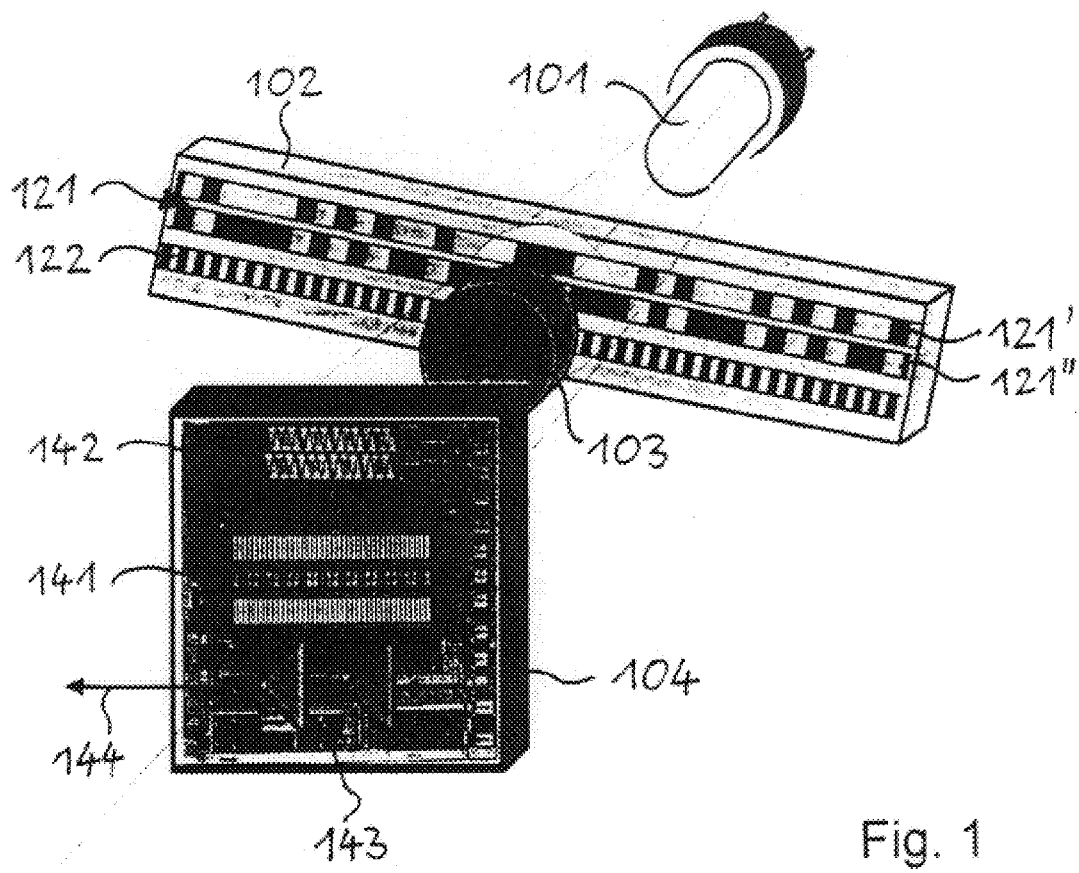
FIG. 1 is a diagrammatic perspective view of a light source, a scale embodiment, an optical imaging system and a photo ASIC.

FIG. 1 shows an electromagnetic radiation source 101, referred to below as a light source, a scale embodiment 102, an optical imaging system 103 and a photo ASIC 104 in an exemplary embodiment of the apparatus according to the invention. The light source 101 can be configured, for example, as a light-emitting diode (LED). The scale embodiment 102 can be configured as a scale or ruler-type element (for a distance measuring apparatus, as in FIG. 1) or as a disc or drum (for an angle measuring apparatus, cf. FIG. 4). It essentially contains two tracks 121, 122 which implement a scale, a first scale-implementing track 121 for an absolute value (coarse value) which can be registered directly, and a second scale-implementing track 122 for incremental values, which form analog signals which can be evaluated and interpolated between two absolute tracks which can be registered (as a rule, SIN/COS signals). The absolute code on the first scale-implementing track 121 can be a pseudo-random code (PRC), for example. In this case, for reasons based on tried and tested differential signal formation, the first scale-implementing track 121 may be present in the form of two partial tracks 121', 121", the two partial tracks 121', 121" containing the same binary code but being inverted in relation to each other (i.e. when there is "0" on the first partial track 121', there is "1" on the second partial track 121", and vice versa).

Figure 2:
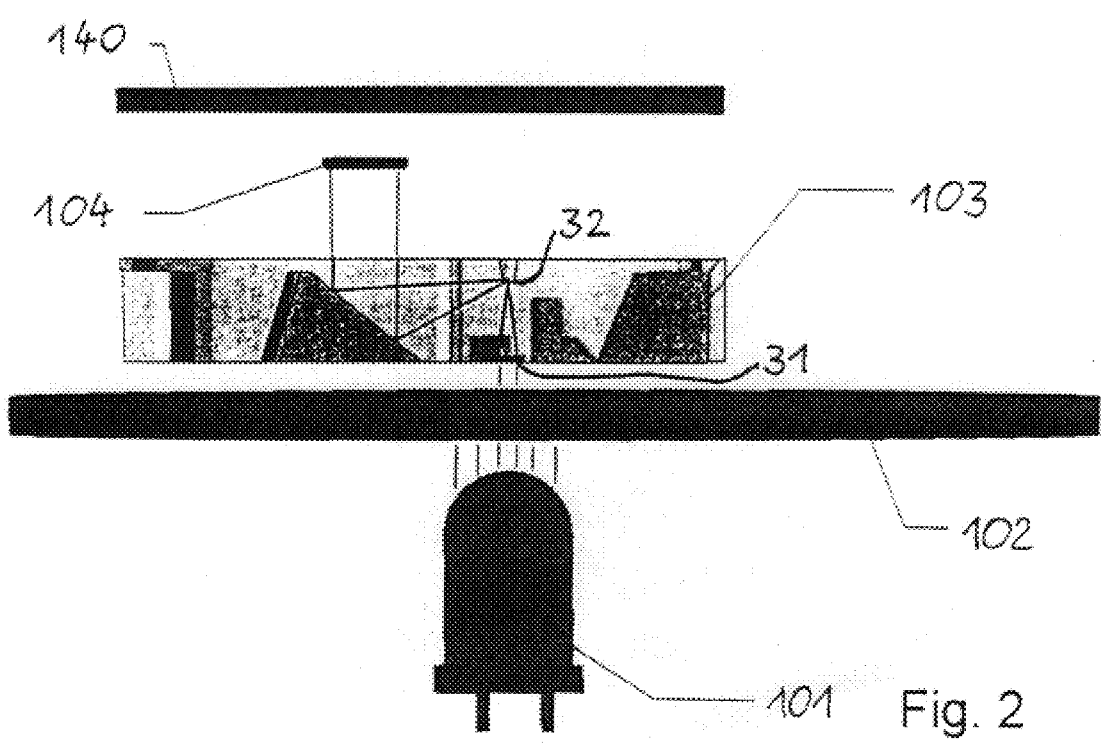
FIG. 2 is a diagrammatic, side elevational view of the elements of FIG. 1 and, in addition, of a supporting substrate.

FIG. 2 illustrates elements of the apparatus according to the invention in a side view. The embodiment of FIG. 2 is a rotary encoder, in which the scale embodiment 102 is a disc, for example a glass disc with chromium encoding. The optical imaging system 103 is preferably configured as a telecentric system, which images the scale-implementing tracks 121, 122 (scales for the absolute and incremental tracks) by transmitted light (or by reflected light, for example through the use of a diffractive film) at the correct magnitude for the dimensions of photosensitive areas of the photo ASIC 104. The system includes an imaging lens 131 and an aperture stop 132 which acts as an aperture diaphragm or exit pupil and is configured as a reflector. The optical imaging system 103 can be integrated in a block, for example one made of plastic. The photo ASIC 104 is preferably applied to a carrier 140, for example a flex print carrier.

In order to explain the photo ASIC 104, reference is made again to FIG. 1 and to Published, Non-Prosecuted German Patent Application No. DE 195 05 176.9. The photo ASIC is essentially provided with photosensitive areas 141 (for absolute track 121) and 142 (for incremental track 122), which provide the detection of the light which has passed from the scale-implementing tracks 121, 122 (absolute and incremental) through the imaging optics 103 to the ASIC 104. The detected light intensity is converted into corresponding digital and analog electrical signals 144 through the use of suitable electronics 143.

Figure 3:
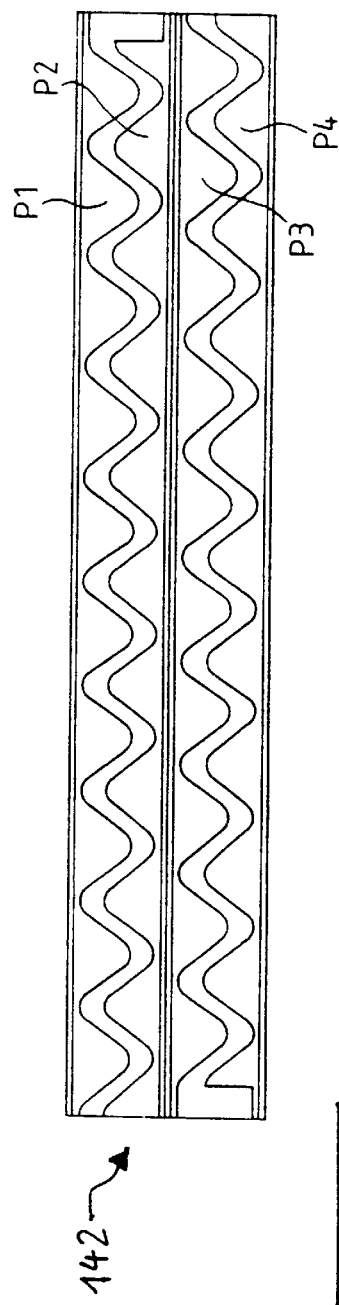
FIG. 3 is a diagrammatic plan view of specifically configured detector areas of a photo ASIC according to the invention.

The photosensitive areas 142 for the incremental track 122 are preferably specifically configured in accordance with FIG. 3. In this embodiment, they are divided into four partial areas P1–P4, which are locally identical to a sine function. The four partial areas P1–P4 are in each case phase-shifted by 90° with respect to one another. If, then, a suitable pattern of light and dark areas of the same period as the sine function is imaged from the scale embodiment 102 onto these areas 142, the four partial areas P1–P4 supply four location-dependent signals in quadrature. This configuration is described in detail in Published, Non-Prosecuted German Patent Application No. DE 195 05 176.9 which is incorporated by reference.

Figure 4:
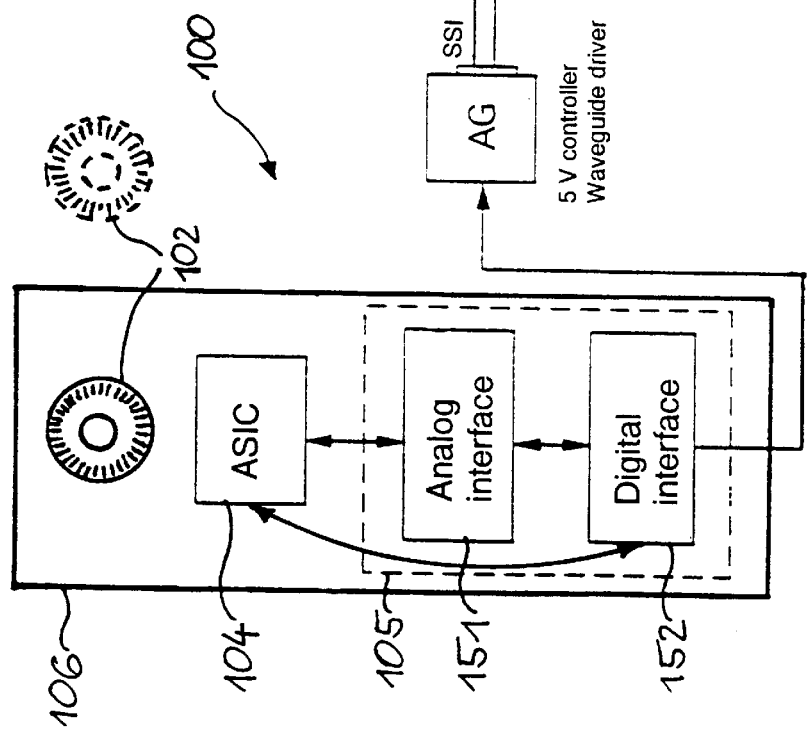
FIG. 4 is a block diagram of an apparatus according to the invention.

FIG. 4 shows, in schematic form, an apparatus according to the invention in the form of a block diagram. Illustrated on the left-hand side of the block diagram are parts of a sensing head 100. The sensing head 100 is accommodated in a housing 106. The scale embodiment 102 can be located inside or outside the housing 106. The alternative of the scale embodiment 102 being located outside the housing 106 is illustrated in dashed lines. At the output of the photo ASIC 104 there are ASIC interface electronics 105; these include an analog interface circuit 151 (semi-analog ASIC) and a digital interface circuit 152 (field programmable gate array FPGA, mask programmable gate array MPGA). In the center of the block diagram, external adapter interfaces AG (transmitter adapter) and AK (customer adapter) for plugs and cables 201 for the data transmission between the sensing head 100 and user and for the voltage supply to the sensing head 100 are illustrated. For the data transmission, optical fibers 201 with appropriate optocouplers are preferably used in the case of long transmission links. Illustrated on the right-hand side of the block diagram is a control system provided by a user, for example through the use of a microcomputer ($\mu$C) or a work station (WS) 301 with an appropriate adapter AK.

It is not necessary to emphasise in particular that the photo ASIC 104 with the interface electronics 105, together with the analog interface circuit 151 and the digital interface circuit 152, can be formed by a single integrated electronic circuit (ASIC). It is also possible to integrate a photo LED 101 as illumination into the electronics, and to consider the imaging optics 103 as being closely related to the photo ASIC 104 or as an integral part of the photo ASIC 104.

The sensor housing 106 for the apparatus according to the invention is essentially used to accommodate the imaging optics 103 with the opto-ASIC 104 and interface electronics 105, and possible plug or cable fixing devices. The scale embodiment 102 can be located inside or outside the sensing head 100. If the scale embodiment 102 is inside the sensing head 100, it is supported there—e.g. in the case of rotary encoders—and mounted appropriately for optical signal transmission.

The analog interface circuit 151 contains the SIN/COS signal processing with suitable comparator circuits. The comparator circuits can be present in two embodiments, namely with threshold-value switches and linking electronics and appropriate operational amplifiers, or with clocked comparators and threshold-value configuration with interpolation evaluation for a binary counter output.

The digital interface circuit 152 contains the digital signal processing of the absolute values registered with the signals from the analog interface circuit and the synchronizing measures, to form a total absolute value. In addition to the processing of specific signals from the photo ASIC 104, further signal processing is realized in the circuit 152, for example permitting the SSI output and including security measures.

Figure 5:
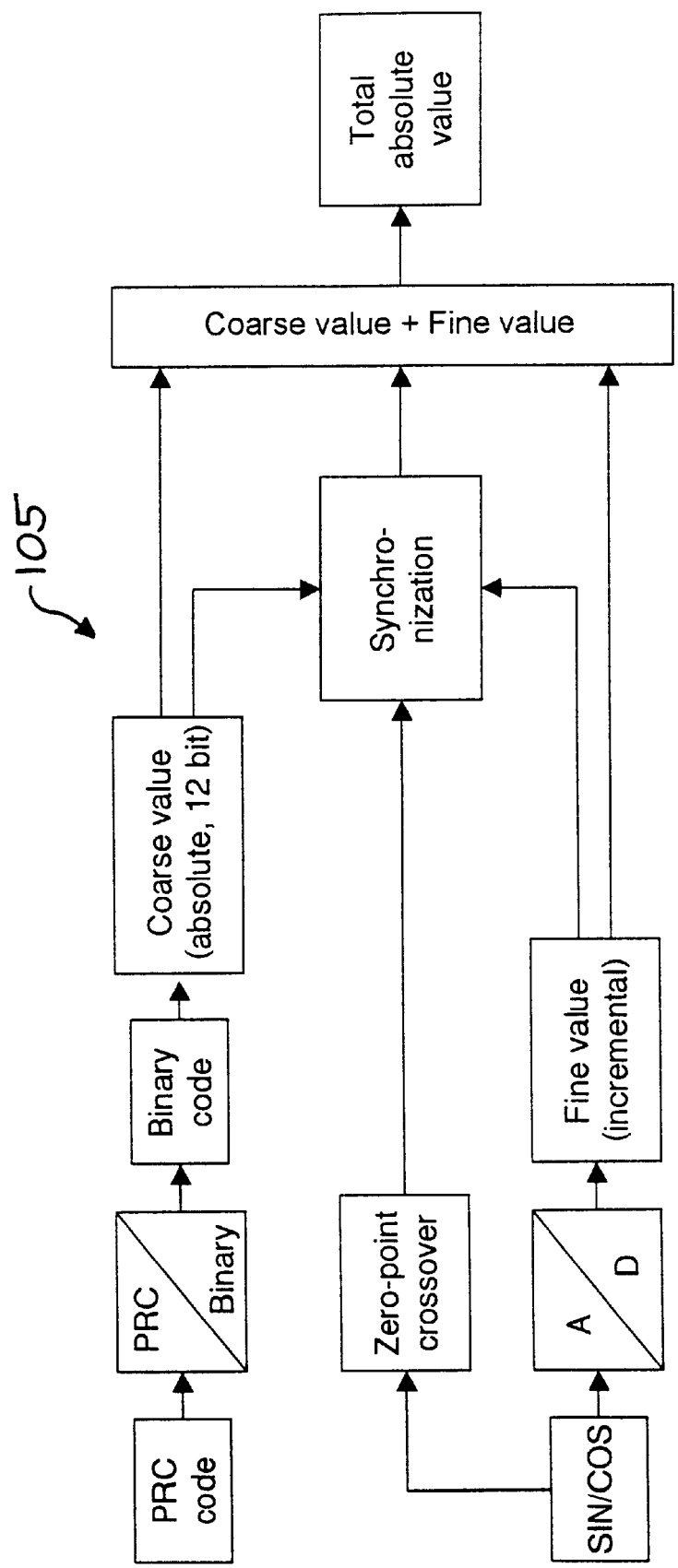
FIG. 5 is a block diagram of interface electronics according to the invention.

FIG. 5 shows the block diagram of the interface electronics 105. It processes the coarse value and fine value continuously supplied by the photo ASIC 104 to form a total absolute value and provides the total absolute value in binary/digital form for a sensor output. The total absolute value is preferably provided in the standard industrial format SSI, which can be used directly by a suitable interface for controlling a machine. In the interface electronics 105 a pseudo random code (PRC code) is converted into a binary code. The coarse value is determined from the binary code. The fine value (incremental value) is determined from SIN/COS signals which are AD converted. The coarse value and the fine value are combined in order to form the total absolute value. A synchronization block is provided for synchronizing the combination of the coarse value (absolute value) and the fine value (incremental value).

In view of the disclosure of the invention, it is possible for those skilled in the art to develop further embodiments, which are within the scope of the invention as defined in the claims.

I claim:

1. An apparatus for measuring at least one of angles and distances, comprising:

a sensing head having a first sensor and a second sensor;

said first sensor determining an absolute value of at least one of an angle and a distance;

said second sensor determining an incremental value of at least one of the angle and the distance, the incremental value lying between two successive absolute values; and a circuit for forming a total absolute value from the absolute value and the incremental value and for providing the total absolute value as a binary/digital value, said circuit for forming the total absolute value being provided in said sensing head.

2. The apparatus according to claim 1, including a synchronization device connected to said circuit for forming the total absolute value, said synchronization device controlling a synchronous combining of incremental values determined by said second sensor for forming the total absolute value.

3. The apparatus according to claim 1, including a device for deriving, within a given range of resolution, a movement direction from incremental values determined by said second sensor, said device for deriving the movement direction being connected to said circuit for forming the total absolute value.

4. The apparatus according to claim 1, wherein:

at least one of said first sensor, said second sensor and said circuit for forming the total absolute value has a signal delay; and a processing device takes account of the signal delay in a signal processing for forming the total absolute value, said processing device is connected to said circuit for forming the total absolute value.

5. The apparatus according to claim 1, including at least one threshold value comparator connected to said second sensor, said at least one threshold value comparator determining the incremental value from an analog signal.

6. The apparatus according to claim 5, wherein said at least one threshold value comparator is a clocked comparator.

7. The apparatus according to claim 1, including at least one adapter for providing a signal decoupling, said at least one adapter being connected to said circuit for forming the total absolute value.

8. The apparatus according to claim 1, including:

at least one adapter connected to said circuit for forming the total absolute value;

a peripheral control system connected to said at least one adapter; and said at least one adapter providing a signal decoupling between said sensing head and said peripheral control system.

9. The apparatus according to claim 7, wherein said at least one adapter includes a voltage supply unit for generating a supply voltage.

10. The apparatus according to claim 7, wherein said at least one adapter includes a DC decoupling device for a signal transmission.

11. The apparatus according to claim 8, wherein said at least one adapter is configured such that said peripheral control system is not affected.

12. The apparatus according to claim 1, including:

a serial interface for outputting the total absolute value, said serial interface being connected to said circuit for forming the total absolute value;

a peripheral control system for presetting levels; and a processing device for processing the levels via said serial interface.

13. The apparatus according to claim 12, wherein said serial interface is an SSI interface.

14. The apparatus according to claim 1, wherein said sensing head is associated with at least one of an RS 422 interface and an RS 485 interface for performing programming functions.

15. A method for measuring at least one of angles and distances, the method which comprises:

determining an absolute value with a first sensor of a sensing head of a measuring apparatus;

determining an incremental value, lying between two successes absolute values, with a second sensor of the sensing head;

forming a total absolute value from the absolute value and the incremental value; and providing the total absolute value as a binary/digital value.

16. The method according to claim 15, which comprises controlling, in a sensor electronic circuit, a synchronous combination of the absolute value and the incremental value for forming the total absolute value by using incremental values determined by the second sensor.

17. The method according to claim 15, which comprises determining a movement direction within a resolution range of the measuring apparatus by using incremental values determined by the second sensor.

18. The method according to claim 15, which comprises including a signal delay of the measuring apparatus in a signal processing when forming the total absolute value.

19. The method according to claim 15, which comprises determining the incremental value from an analog signal by using threshold value comparators.

20. The method according to claim 15, which comprises determining the incremental value from an analog signal by using clocked threshold value comparators.

21. The method according to claim 15, which comprises processing levels impressed by a peripheral control system.

22. The method according to claim 21, which comprises transmitting, with the levels impressed by the peripheral control system, information relevant in terms of level and time by using a combination of a data line and a clock line of a serial interface.

23. The method according to claim 22, which comprises lengthening a clock signal, after a negative clock edge, to a time interval longer than a monoflop time of the serial interface.

24. The method according to claim 22, which comprises outputting, with the data line in the serial interface, a LOW signal if a fault is detected.

25. The method according to claim 22, which comprises selecting an asymmetrical mark-to-space ratio for increasing a transmission frequency.

26. The method according to claim 22, which comprises setting, via the serial interface, the total absolute value to "zero" with a defined clock edge.

27. The method according to claim 15, which comprises providing, in addition to the total absolute value, analog signals of incremental values.

* * * * *